Figure 1:
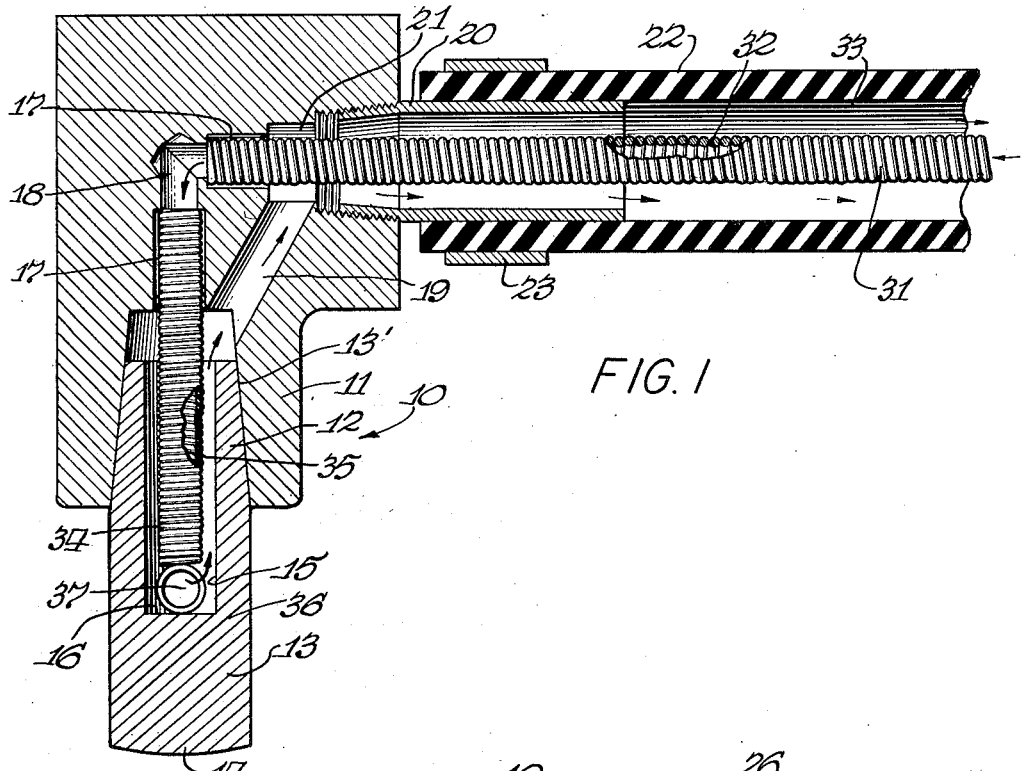

June 25, 1957  C. A. CZOHARA  2,797,305
COOLING SYSTEM FOR ELECTRODE TIPS
Filed May 11, 1955

INVENTOR
CHESTER A. CZOHARA
ATTORNEY

United States Patent Office 2,797,305
Patented June 25, 1957

2,797,305

COOLING SYSTEM FOR ELECTRODE TIPS

Chester A. Czohara, Chicago, Ill., assignor to International Harvester Company, a corporation of New Jersey Application May 11, 1955, Serial No. 507,679

2 Claims. (Cl. 219—120)

This invention relates to welding apparatus and more particularly it relates to a welding gun.

It is a prime object of this invention to provide an improved welding gun of a type generally utilized in connection with multi-gun welders. Multi-gun welders generally have two or more welding guns connected thereto. These guns generally are connected by flexible hose connections to a source of cooling liquid for directing said liquid to the electrode tip of the gun and for discharging the liquid therefrom.

It is a prime object to provide an improved welding gun particularly adapted for multi-gun welders, the gun having a minimum number of hose connections connected thereto.

Still another object of the invention is to provide a cooling system for a welding gun, the system comprising a single flexible hose connection for directing and discharging cooling liquid from the electrode of the gun.

Still another object of the invention is to provide an improved cooling system for welding guns, the system including a minimum number of conduit connections thereby eliminating, to a great extent, the possibility of liquid leaks.

These and other objects will become more readily apparent from a reading of the description when examined in connection with the accompanying sheet of drawing.

Figure 2:
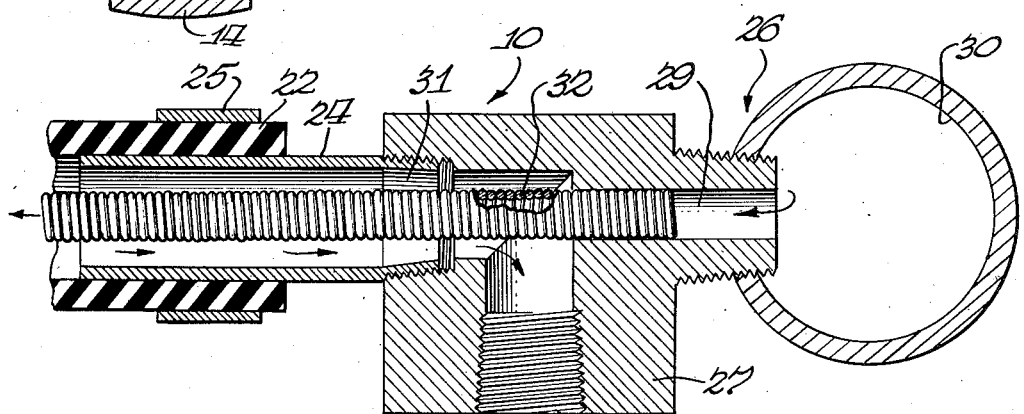

In the drawing:

Figure 1 is a cross sectional view through a portion of a welding gun showing an electrode and holder including portions of a cooling arrangement connected thereto; and Figure 2 is a cross sectional view of a welding gun cooling system connection connected to a cooling liquid manifold unit.

Referring particularly to Figure 1, a welding apparatus or welding gun is generally designated by the reference character 10. The gun 10 comprises an electrode tip holder 11 having a tapered elongated recess 12. An electrode 13 is provided with a tapered portion 13' which is tightly wedged into the tapered recess 12. The electrode 13 is provided at one end with a contact point or engaging member 14. The electrode tip 13 is provided with an open end bore 15 having a closed end as indicated at 16. The open end of the bore 15 is, as indicated, in communication with a portion of the recess 12.

The tip holder 11 is provided with a right angle inlet bore 17 having a reduced elbow portion as indicated at 18. An outlet bore 19 is in communication with the recess 12 as indicated. A connector nipple 20 is tightly screwed into the tip holder 11. The connector nipple 20 is in communication with an annular enlarged bore 21 concentric with the inlet bore 17 and in communication with the outlet bore 19.

The connector nipple 20 is connected to one end of a flexible hose or conduit 22 by means of a strap 23. A connector nipple 24 is positioned within the other end of the flexible hose 22 and is secured thereto by means of a strap 25. The connector nipple 24 is in turn connected to a manifold unit generally designated by the reference character 26. The manifold unit 26 comprises a distributor block 27 having a right angle outlet bore 28 and an inlet bore 29. A liquid supply pipe or reservoir 30 is connected to the distributor block 27 and is in communication with the inlet bore 29. The outlet bore 28 is connected by suitable conduit means (not shown) to a drain or return line and the liquid supply pipe 30 is suitably connected to a source of cooling fluid or liquid under pressure.

The flexible conduit 22 has a flexible tube 31 concentrically positioned therein. The tube 31 may be made of a suitable flexible material and, as indicated, may be a spring having its coils closely positioned to provide in effect an inlet passage 32. The spring 31, as best shown in Figure 1, has one end disposed in the right angle inlet bore 17 and as shown in Figure 2 has its other end disposed in the bore 29. Thus the passage 32 is in communication with the liquid supply pipe 30 and also is in communication with the inlet bore 17 of the electrode tip holder 11.

As indicated, the spring 31 is concentrically positioned within the flexible tube or hose 22. In this position the hose 22 is also provided with an outlet passage 33 which is as indicated in Figure 1 in communication with the outlet bore 19, and as indicated in Figure 2 in communication with the right angle outlet bore 28. The welding gun shown has, of course, the usual electrical connections necessary to provide for full operation of the welding equipment. None of this equipment has been shown since it is not pertinent to the present invention. The invention is primarily concerned with the cooling system for the electrode tip which is connected to the electrode tip holder. A plurality of welding guns of this type may be connected to a single welding machine and cooling system. When the guns are connected in this multi-gun assembly they become exceedingly hard to handle, clumsy, etc., by virtue of the many flexible hoses which are provided in the ordinary gun for cooling the electrode tips. By the arrangement shown the flexible hoses are greatly reduced and handling of the gun is greatly simplified especially when utilized in connection with a multi-gun assembly.

In operation the cooling system is effective to cool the electrode tip 13 by virtue of the inflow of a cooling liquid through the passage 32 and to the discharge end 37 of the passage 35. The warm liquid is then discharged through the bore 19, through the outlet passage 33, through the bore 28 and to a suitable drain. Thus it can be seen that the possibilities of leakage are greatly reduced since a minimum number of fluid connections are provided. Further, the elimination of additional hoses reduces the drag or wear on the gun components which can be effectively and more easily handled due to the decrease in weight. Generally a more compact gun unit is realized. Also, for maintenance purposes, the lesser number of flexible conduits afforded by the present invention greatly facilitate the maintenance of this equipment. Thus it is readily apparent that the objects of the invention have been fully achieved and it must be realized that variations and modifications are contemplated without departing from the spirit of the invention as disclosed or the scope thereof as defined in the appended claims.

What is claimed is:

1. A welding gun comprising an electrode tip holder, said holder having an enlarged recess, an electrode tip disposed in said recess, said electrode tip having a longitudinally extending bore in communication with said recess, a flexible conduit connected at a first end to said holder, a first spring tube coaxially disposed within said conduit, said spring tube having an inlet passage, said conduit having an outlet passage encircling said spring tube, said holder having a first bore concentric with said conduit and communicating with said outlet passage, a second bore in said holder connected to said first bore, and disposed in angular relation with respect thereto, said first spring tube extending within said first bore and communicating with said second bore, a second spring tube in said holder communicating with said second bore, said second spring tube projecting coaxially into said longitudinally extending bore and having an opening for discharging cooling liquid within said longitudinally extending bore, said second spring tube having a smaller cross sectional dimension than said longitudinal bore wherein cooling liquid may be discharged from said longitudinal bore to said recess, and a return bore on said head communicating with said first bore and said recess to return liquid to said outlet passage, said inlet and outlet passages being adapted to connect to a liquid reservoir for receiving and discharging liquid.

2. A welding gun comprising an electrode tip holder, said holder having an enlarged recess, an electrode tip disposed in said recess, said electrode tip having a longitudinally extending bore in communication with said recess, a flexible conduit connected at a first end to said holder, a spring tube disposed within said conduit, said spring tube having an inlet passage, said conduit and spring tube providing an outlet passage, said holder having a first bore concentric with said conduit and communicating with said outlet passage, a second bore in said holder connected to said first bore, said spring tube extending within said first bore and communicating with said second bore, a second spring tube in said holder communicating with said second bore, said second spring tube projecting into said longitudinally extending bore and having an opening for discharging cooling liquid within said bore to cool said tip, said longitudinal bore being adapted to return cooling liquid to said recess, and a return bore on said head communicating with said first bore and said recess to return liquid to said outlet passage, said passages being adapted to connect to a liquid reservoir.

References Cited in the file of this patent

UNITED STATES PATENTS

| | | |
|---|---|---|
| 2,355,145 | Carlson | Aug. 8, 1944 |
| 2,475,209 | Tucker | July 5, 1949 |